United States Patent [19]

Bachus

[11] Patent Number: 5,760,862
[45] Date of Patent: Jun. 2, 1998

[54] ELECTRO-OPTICAL DISPLAY DEVICE WITH EDGE CONNECTION

[75] Inventor: Marcel S. B. Bachus, Heerlen, Netherlands

[73] Assignee: U.S. Philips Corporation, New York, N.Y.

[21] Appl. No.: 673,837

[22] Filed: Jun. 27, 1996

[30] Foreign Application Priority Data

Jun. 22, 1995 [EP] European Pat. Off. ............ 95201769

[51] Int. Cl.[6] .................... G02F 1/1343; G02F 1/1345
[52] U.S. Cl. .................. 349/149; 349/148; 349/150
[58] Field of Search .................. 349/149, 150, 349/148

[56] References Cited

U.S. PATENT DOCUMENTS

| | | | |
|---|---|---|---|
| 4,474,432 | 10/1984 | Takamatsu | 349/150 |
| 4,549,174 | 10/1985 | Funada et al. | 349/150 |
| 4,690,510 | 9/1987 | Takamatsu et al. | 350/334 |
| 4,763,993 | 8/1988 | Vogeley et al. | 349/149 |
| 5,398,128 | 3/1995 | Tajima et al. | 349/150 |
| 5,436,744 | 7/1995 | Arledge et al. | 349/150 |
| 5,442,470 | 8/1995 | Hashimoto | 349/149 |
| 5,563,619 | 10/1996 | Hilbrink | 349/149 |

OTHER PUBLICATIONS

SID 79 Digest, p. 65, 1979.

*Primary Examiner*—William L. Sikes
*Assistant Examiner*—Tiep H. Nguyen
*Attorney, Agent, or Firm*—Jack D. Slobod

[57] ABSTRACT

Display device which will be considerably flatter by contacting conductor tracks on one side of a substrate via connectors with conductor parts contacting the conductor tracks around the edge of the substrate with contact faces on the other side of the substrate. These contact faces extend parallel to the substrate and may directly or indirectly contact conductor tracks on, for example a printed circuit board.

4 Claims, 2 Drawing Sheets

ELECTRO-OPTICAL DISPLAY DEVICE WITH EDGE CONNECTION

BACKGROUND OF THE INVENTION

The invention relates to a display device comprising a first and a second substrate with an electro-optical material between the two substrates each being provided with picture electrodes defining pixels with the intermediate electro-optical material, the first substrate being provided beyond its part located opposite the second substrate with connection conductors extending as far as an edge of the first substrate. The invention also relates to such a display device in which the connection conductors are connected in an electrically conducting manner to connection tracks on a support.

Display devices of this type are generally used in measuring equipment, but also in, for example, portable telephones. Display devices of the type described above are generally known. With the ongoing miniaturisation in electronics, it is possible to realise an increasing number of drive electronics on one of the substrates. However, on the other hand there is a tendency to manufacture the actual display panel (display section) as a standard component. If such a standard component is mounted in an apparatus, for example, by soldering on a printed circuit board, notably the thickness dimensions of the ultimate devices may increase considerably. Although the use of pressure contacts via elastomers (referred to as zebra contacts) is also known, these contacts can only be used if the connection conductors on the first substrate are located on that surface of the substrate which, in the finished state, is located opposite the connection tracks on the support.

OBJECTS AND SUMMARY OF THE INVENTION

It is, inter alia, an object of the invention to provide a display device of the type described above, in which connection conductors on the first substrate can be easily contacted on the surface of the first substrate which, in the finished state, is remote from the connection tracks on the support.

It is another object of the invention to provide a display device having such connection conductors and associated contacts that very flat display devices can be manufactured.

It is a further object of the invention to provide a display device having such connection conductors and associated contacts that a robust device is obtained.

To this end, the invention is characterized in that, at the area of said edge, the display device has a connector housing which embraces the edge and comprises a plurality of conductor parts which, viewed in the direction of the edge, are U-shaped and connect each connection conductor in an electrically conducting manner to an associated contact face which is substantially parallel to the first substrate and is located on the side of the connector housing remote from the second substrate.

Another embodiment is characterized in that, at the area of said edge, the display device has a connector housing comprising a plurality of conductor parts which, viewed in the direction of the edge, partly embrace said edge and connect each connection conductor in an electrically conducting manner to an associated contact face which is substantially parallel to the first substrate and is located on the side of the connector housing remote from the second substrate.

Since the U-shape of the conductor parts (or because they embrace the edge) create contact faces at the area of the edge, which faces substantially coincide with the surface of the first substrate opposite the support (to be provided at a later stage), the simple contacting via an elastomer (zebra contact) can be used again for contacting to a support (printed circuit board or the like).

Since the minimum distance between the support and the first substrate is now determined by the part of the connector housing located between the first substrate and the support, the thicknesses of the contact faces and the elastomer (which, if necessary, may be omitted), a very flat display device can be obtained.

Moreover, contacting is realized via a clamping system, which has proved to lead to a very robust connection.

To decrease the contact resistance of the contacts, a (graphite-containing) contact paste is provided at the area of the contacts, if necessary. To prevent smears of such a paste between juxtaposed contacts when providing the connector, a preferred embodiment of a display device according to the invention is characterized in that a face of the connector housing located against the first substrate is provided with depressions between the conductor parts.

These and other aspects of the invention will be apparent from and elucidated with reference to the embodiments described hereinafter.

BRIEF DESCRIPTION OF THE DRAWINGS

In the drawings:

FIG. 2 shows diagrammatically a part of a second embodiment of the display device according to the invention, while

The Figures are diagrammatic and not to scale; corresponding parts usually have the same reference numerals.

DESCRIPTION OF THE PREFERRED EMBODIMENTS

Figure 1:
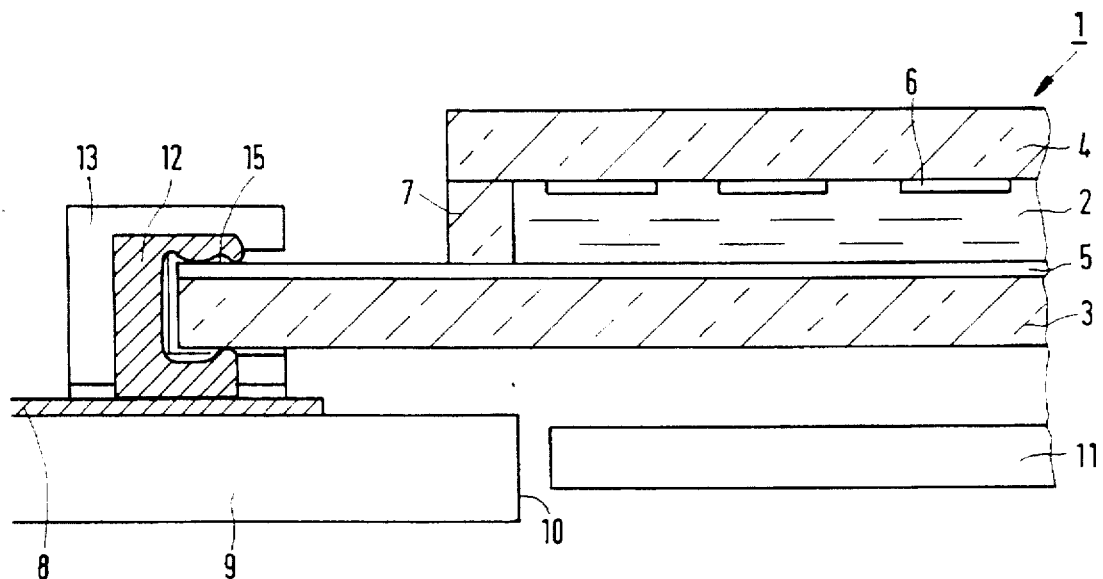
FIG. 1 shows diagrammatically a part of a first embodiment of a display device according to the invention.

FIG. 1 is a diagrammatic cross-section of a part of a liquid crystal display device comprising a liquid crystal cell 1 with a twisted-nematic liquid crystal material 2 in this example, which material is present between two transparent substrates 3, 4 of, for example glass, provided with electrodes 5, 6. The device further comprises polarizers (not shown) whose direction of polarization is, for example mutually perpendicularly crossed. The device also comprises orientation layers (not shown) which orient the liquid crystal material on the inner walls of the substrates in such a way that the cell has a twist angle of 90° in this example. In this case, the liquid crystal material has a positive optical anisotropy and a positive dielectric anisotropy. If the electrodes 5, 6 are energized with an electric voltage, the molecules and hence the directors direct themselves towards the field. The cell 1 is bounded by a cell wall or sealing edge 7.

The transparent electrodes 5, 6 of, for example ITO (indium tin oxide), which mutually cross each other in this example and define pixels at the area of the crossings, should be provided with drive voltages. These are usually applied externally, for example, via conductor tracks 8 on a support 9, for example, a printed circuit board. In the device of FIG.

1, the support has an aperture 10 in which, if necessary, an illumination source 11 can be provided.

In the example of FIG. 1, the electrode 5 (ITO) extends as a conductor track to beyond the actual display area on the substrate 3 and is connected in an electrically conducting manner to the conductor track 8 by means of a substantially U-shaped conductor part 12. Viewed transversely to the drawing, the device of FIG. 1 may comprise a plurality of such conductor parts 12 which are accommodated in a connector housing 13. The connector parts are, for example, punched from a material having a satisfactory electrical conductance such as copper or silver, or locally gold-plated phosphor bronze and then moulded in a synthetic material housing. The shape and dimension of the conductor parts and the connector housing are preferably chosen to be such that a clamping connection is obtained around the edge of the substrate 3 after the connector housing has been slid on. A satisfactory electrically conducting contact is then obtained between the conductor tracks 5 and the conductor parts 12. To avoid contact resistances, a conducting paste 15 may be provided, if necessary, on the contact areas between conductor tracks 5 and the conductor parts 12. The electric contact between the conductor part 12 and the conductor 8 may be realized, for example, by means of a mechanical clamping connection, for example when the support 9 and the illumination source 11 are accommodated in one half of a housing and the cell with the connector housing is accommodated in another half, both halves being secured together by means of a clamp or snap connection.

Figure 2:
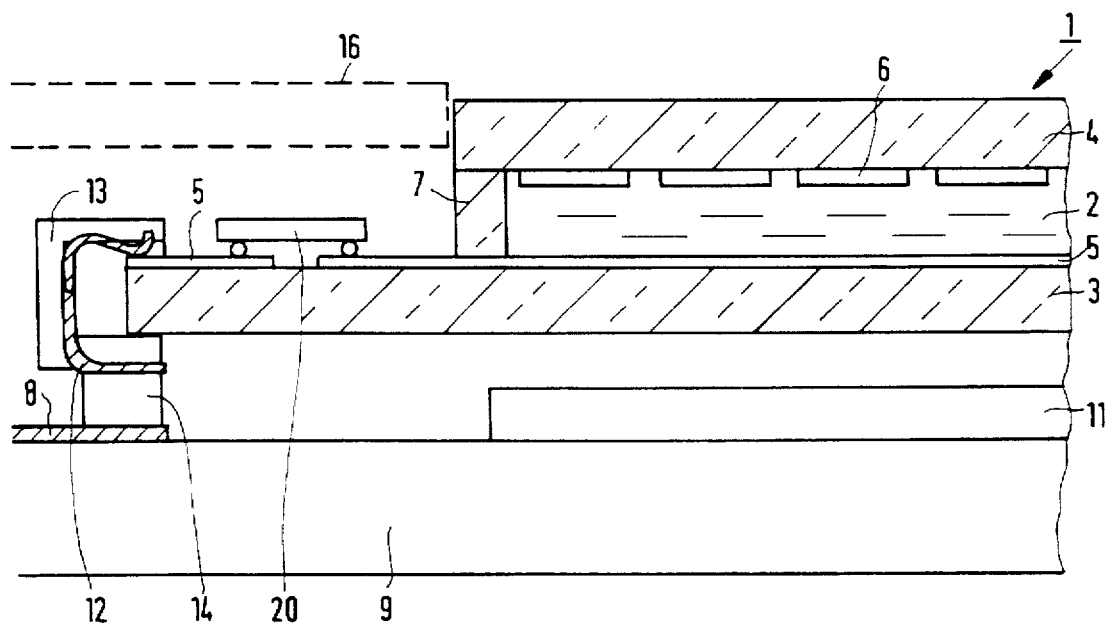

In the example of FIG. 2, the electrode 5 (ITO) extends as a conductor track to beyond the actual display area on the substrate 3 and is connected in an electrically conducting manner to an integrated circuit 15 which is provided, for example by means of chip-on-glass techniques and provides the actual cell with drive signals. The integrated circuit 20 is driven in its turn via signals presented to the substrate 3 via the connection conductors 5'. In the relevant example, the illumination source 11 in the form of an optical guide is present on the support 9. The connector housing 13 again has a conductor part 12 which contacts the connection conductor 5' in an electrically conducting manner and, viewed transversely to the direction of the edge of the substrate 3, partly embraces said edge and connects the connection conductor 5' in an electrically conducting manner to an associated contact face which is substantially parallel to the first substrate and is located on the side of the connector housing 13 remote from the substrate 4. The shape and dimension of the conductor parts and the connector housing are preferably chosen to be such that a clamping connection is obtained around the edge of the substrate 3 after the connector housing has been slid on. In this example the connector parts 12 are connected in an electrically conducting manner to corresponding conductor tracks 8 via zebra contacts 14 (elastomers). This provides a slightly larger interspace between substrate 3 and support 9 for accommodating the illumination source 11, if necessary. The electrically conducting connection between the conductor part 12 and the conductor track 8 is obtained, for example again via a clamp or snap connection. For example, the cell 1 with the connector 13 may be built in a first housing 16 (shown diagrammatically), for example the display section of an apparatus to be manufactured, such as a mobile telephone or a measuring instrument, while the support 8 with accessories and possible other electronics are accommodated in a second housing. Via said clamp connection, the complete apparatus is assembled, while the desired contact is obtained simultaneously. From a manufacturing-technical point of view, such a structure is favourable because only one type of cell with connector can be easily provided in various applications. The small distance between support 9 and substrate 3 (up to a minimum of approximately 1 mm) notably provides the possibility of obtaining very flat, hand-held telephones.

A comparison of the connectors 13 and the conductor parts 12 in FIGS. 1 and 2 elucidates that the position of the conductor parts 12 may vary. For example, the conductor part 12 in FIG. 1 is in direct contact with the lower side (the side remote from the liquid) of the substrate 3, but this is not directly necessary, as is shown in FIG. 2. The conductor parts may alternatively project partly from the connector housing at locations other than the contact face located on the side of the connector housing remote from the second substrate.

Figure 3:
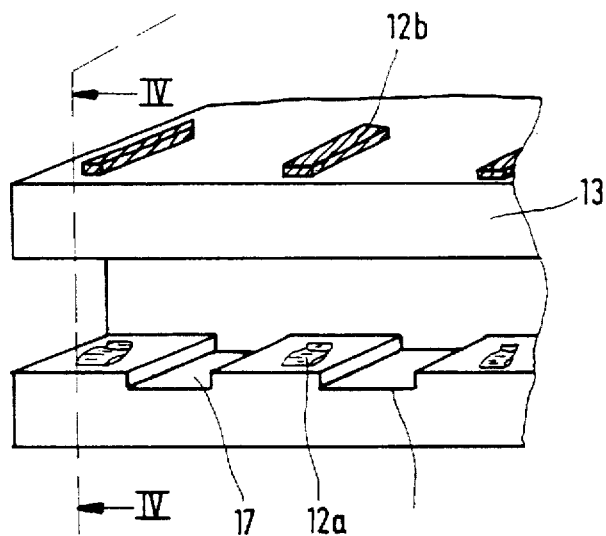
FIG. 3 is a diagrammatic elevational view of a connector used which is upside down with respect to the connector shown in FIGS. 1 and 2.

As mentioned above, a contact paste (for example, filled with graphite) may be provided, if necessary, at the area of the contacts between the conductor parts 12 and the electrodes or connection conductors 5, 5'. When the connector housing 13 is being provided with conductor parts 12, smears may occur of particles of this paste provided in advance on the conductor electrodes, which results in a short-circuit between juxtaposed conductor electrodes. FIG. 3 is a diagrammatic elevational view of a part of a connector 13. This connector comprises conductor parts 12a and 12b which contact electrodes or connection conductors 5, 5' and conductor tracks 8, respectively (FIG. 2). Depressions or grooves 17 are present between the conductor parts 12a and 12b. During possible spreading, the paste is left in these depressions so that there will be no short-circuit between adjacent electrodes or connection conductors 5, 5'. Such depressions may also be used in other connector connections in which these kinds of problems of spreading contact paste occur.

Figure 4:
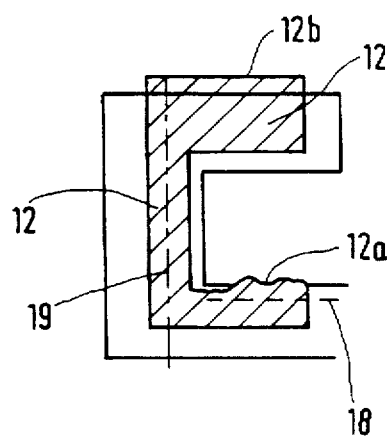
FIG. 4 is a cross-section taken on the line IV—IV in FIG. 3.

FIG. 4 is a cross-section taken on the line IV—IV in FIG. 3. The broken line 18 indicates the location of the bottoms of the depressions 17 located outside the plane of the drawing. The dot and dash line indicates a possible other boundary of the connector housing, in which parts 12c of the conductor parts are located outside the actual connector housing.

In summary, the invention relates to a display device which will be considerably flatter by contacting conductor tracks at one side of a substrate via connectors with conductor parts which contact the conductor tracks around the edge of the substrate with contact faces on the other side of the substrate. These contact faces extend parallel to the substrate and may directly or indirectly contact conductor tracks on, for example, a printed circuit board.

I claim:

1. A display device comprising a first and a second substrate with an electro-optical material between the two substrates each being provided with picture electrodes defining pixels with the intermediate electro-optical material, the first substrate being provided beyond its part located opposite the second substrate with connection conductors extending as far as an edge of the first substrate, characterized in that, at the area of said edge, the display device has a connector housing which embraces the edge and comprises a plurality of conductor parts which, viewed in the direction of the edge, are U-shaped and connect each connection conductor in an electrically conducting manner to an associated contact face which is substantially parallel to the first substrate and is located on the side of the connector housing remote from the second substrate, there being a contact paste applied between the conductor parts and corresponding connection conductors, and the face of the connector housing located against the first substrate at the side of the picture electrodes being provided with depressions between the conductor parts to prevent smearing of the contact paste between adjacent conductor parts.

2. A display device comprising a first and a second substrate with an electro-optical material between the two substrates each being provided with picture electrodes defining pixels with the intermediate electro-optical material, the first substrate being provided beyond its part located opposite the second substrate with connection conductors extending as far as an edge of the first substrate and being connected in an electrically conducting manner to connection tracks on a support, characterized in that, at the area of said edge, the display device has a connector housing which embraces the edge and comprises a plurality of conductor parts which, viewed in the direction of the edge, are U-shaped and connect each connection conductor in an electrically conducting manner to an associated contact face which is substantially parallel to the first substrate and is located on the side of the connector housing remote from the second substrate, said contact face being connected in an electrically conducting manner to at least a connection track on the support, there being a contact paste applied between the conductor parts and corresponding connection conductors, and the face of the connector housing located against the first substrate at the side of the picture electrodes being provided with depressions between the conductor parts to prevent smearing of the contact paste between adjacent conductor parts.

3. A display device comprising a first and a second substrate with an electro-optical material between the two substrates each being provided with picture electrodes defining pixels with the intermediate electro-optical material, the first substrate being provided beyond its part located opposite the second substrate with connection conductors extending as far as an edge of the first substrate, characterized in that, at the area of said edge, the display device has a connector housing comprising a plurality of conductor parts which, viewed in the direction of the edge, partly embrace said edge and connect each connection conductor in an electrically conducting manner to an associated contact face which is substantially parallel to the first substrate and is located on the side of the connector housing remote from the second substrate, there being a contact paste applied between the conductor parts and corresponding connection conductors, and the face of the connector housing located against the first substrate at the side of the picture electrodes being provided with depressions between the conductor parts to prevent smearing of the contact paste between adjacent conductor parts.

4. A display device comprising a first and a second substrate with an electro-optical material between the two substrates each being provided with picture electrodes defining pixels with the intermediate electro-optical material, the first substrate being provided beyond its part located opposite the second substrate with connection conductors extending as far as an edge of the first substrate and being connected in an electrically conducting manner to connection tracks on a support, characterized in that, at the area of said edge, the display device has a connector housing comprising a plurality of conductor parts which, viewed in the direction of the edge, partly embrace said edge and connect each connection conductor in an electrically conducting manner to an associated contact face which is substantially parallel to the first substrate and is located on the side of the connector housing remote from the second substrate, said contact face being connected in an electrically conducting manner to at least a connection track on the support, there being a contact paste applied between the conductor parts and corresponding connection conductors, and the face of the connector housing located against the first substrate at the side of the picture electrodes being provided with depressions between the conductor parts to prevent smearing of the contact paste between adjacent conductor parts.

* * * * *